(12) United States Patent
Kwon

(10) Patent No.: US 7,869,579 B2
(45) Date of Patent: Jan. 11, 2011

(54) SELECTABLE REPLAY OF BUFFERED CONVERSATION IN A VOIP SESSION

(75) Inventor: Ohsuk Dennis Kwon, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1233 days.

(21) Appl. No.: 11/297,983

(22) Filed: Dec. 9, 2005

(65) Prior Publication Data

US 2007/0133524 A1 Jun. 14, 2007

(51) Int. Cl.
*H04M 1/64* (2006.01)
(52) U.S. Cl. .................................. 379/88.17; 455/412.1
(58) Field of Classification Search ......... 370/354–357; 379/88.17, 88.14, 68, 85; 455/18, 9, 412.1; 709/205–207
See application file for complete search history.

(56) References Cited

U.S. PATENT DOCUMENTS

| | | | | | |
|---|---|---|---|---|---|
| 4,834,551 | A | * | 5/1989 | Katz | 379/68 |
| 5,361,327 | A | * | 11/1994 | Takahashi | 706/22 |
| 6,539,421 | B1 | | 3/2003 | Appelman et al. | |
| 6,792,093 | B2 | * | 9/2004 | Barak et al. | 379/202.01 |
| 6,795,429 | B1 | * | 9/2004 | Schuster et al. | 370/352 |
| 6,798,872 | B1 | * | 9/2004 | Matsumoto et al. | 379/142.01 |
| 6,823,050 | B2 | * | 11/2004 | Brown et al. | 379/93.21 |
| 6,839,669 | B1 | * | 1/2005 | Gould et al. | 704/246 |
| 6,987,841 | B1 | * | 1/2006 | Byers et al. | 379/88.17 |
| 2002/0176546 | A1 | * | 11/2002 | Dietz et al. | 379/67.1 |
| 2003/0007606 | A1 | * | 1/2003 | Suder et al. | 379/32.04 |
| 2003/0012346 | A1 | * | 1/2003 | Langhart et al. | 379/67.1 |
| 2005/0089186 | A1 | * | 4/2005 | Kulas | 381/384 |
| 2005/0159122 | A1 | | 7/2005 | Mayer | |
| 2005/0210394 | A1 | | 9/2005 | Crandall et al. | |
| 2006/0047820 | A1 | | 3/2006 | Sung et al. | |
| 2006/0056599 | A1 | * | 3/2006 | Cragun | 379/67.1 |
| 2006/0126804 | A1 | | 6/2006 | Lee et al. | |
| 2006/0146989 | A1 | | 7/2006 | Janssen | |
| 2006/0187900 | A1 | * | 8/2006 | Akbar | 370/352 |
| 2007/0041522 | A1 | * | 2/2007 | Abella et al. | 379/88.14 |

OTHER PUBLICATIONS

Office Communication for U.S. Appl. No. 11/297,981, mailed on Aug. 20, 2008.
Office Communication for U.S. Appl. No. 11/297,981, mailed on Jan. 29, 2009.

(Continued)

*Primary Examiner*—Simon Sing
*Assistant Examiner*—Assad Mohammed
(74) *Attorney, Agent, or Firm*—Frommer Lawrence & Haug LLP; Jamie L. Wiegand

(57) ABSTRACT

A system, method, and apparatus are directed to enabling a user to record VOIP conversations for selective instant replay. The VOIP conversation may be automatically recorded upon initiation of the conversation, or the user may select to record at least a portion of the VOIP conversation. At any point during the VOIP conversation, the user may select to bookmark a position for later replay. During the VOIP conversation, the user may select to instantly replay at least some of the recorded VOIP conversation. The user may select to instantly replay from a beginning of the recorded conversation, from the bookmarked position, or from a pre-determined time interval into the recorded conversation. Upon completion of the instant replay, the user may then return to a latest chronological rewind position within the recorded VOIP conversation. The other party may also be provided an indicator that the conversation is being recorded.

20 Claims, 5 Drawing Sheets

OTHER PUBLICATIONS

Office Communication for U.S. Appl. No. 11/297,981, mailed on Jul. 7, 2009.

replaytv, "Announcing an all new ReplayTV Experience", Digital Networks North America, Inc., 1 page, 2006. http://www.digitalnetworksna.com/replaytv/default.asp.

replaytv, "Features and Benefits", Digital Networks North America, Inc., pp. 1-2, 2006. http://www.digitalnetworksna.com/dvr/5500/features.asp.

replaytv, "Find Answer", Digital Networks North America, Inc., pp. 1-2, 2006 http://www.digitalnetworksna.com/support/replaytv/find_answer.asp?FAQID=2.

replaytv, "Find Answer", Digital Networks North America, Inc., 1 page, 2006 http://www.digitalnetworksna.com/support/replaytv/document.asp?docID=258.

ReplayTV 5500 User's Guide, Digital Networks North America, Inc., pp. 1-84, 2003.

\* cited by examiner

SELECTABLE REPLAY OF BUFFERED CONVERSATION IN A VOIP SESSION

BACKGROUND OF THE INVENTION

The present invention relates generally to network communications, and more particularly, but not exclusively, to a system and method for enabling a user to record VOIP conversations for selective instant replay.

Internet Protocol (IP) Telephony, also known as Voice over Internet Protocol (VOIP), is a technology that makes it possible to have a voice conversation over an IP network, such as the Internet, instead of a dedicated voice transmission line.

Depending on the service, one way to place a VOIP call is to pick up a phone and dial a number, using an adaptor that connects to an existing high-speed network connection. The call goes through a local telephone company to a VOIP provider. The phone call goes over the Internet to the called party's local telephone company for the completion of the call. Another way is to utilize a microphone headset plugged into a computer. The number is placed using the keyboard and may be routed through an IP network. Still another way is to employ specialized phones, sometimes called IP Phones, or VOIP phones, that may look like a normal phone. Such VOIP phones may connect to the network through an RJ-45 connector, or operate through a wireless connection.

Because VOIP make it possible to have voice conversations over IP networks, VOIP allows for a cost effective alternative to the traditional public switched telephone networks (PSTNs). Because of its relatively lower costs and ease of use, VOIP phone services have been rapidly increasing in popularity. With such an increase in popularity, there has been an increased desire to improve upon its functionality. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

Figure 1:
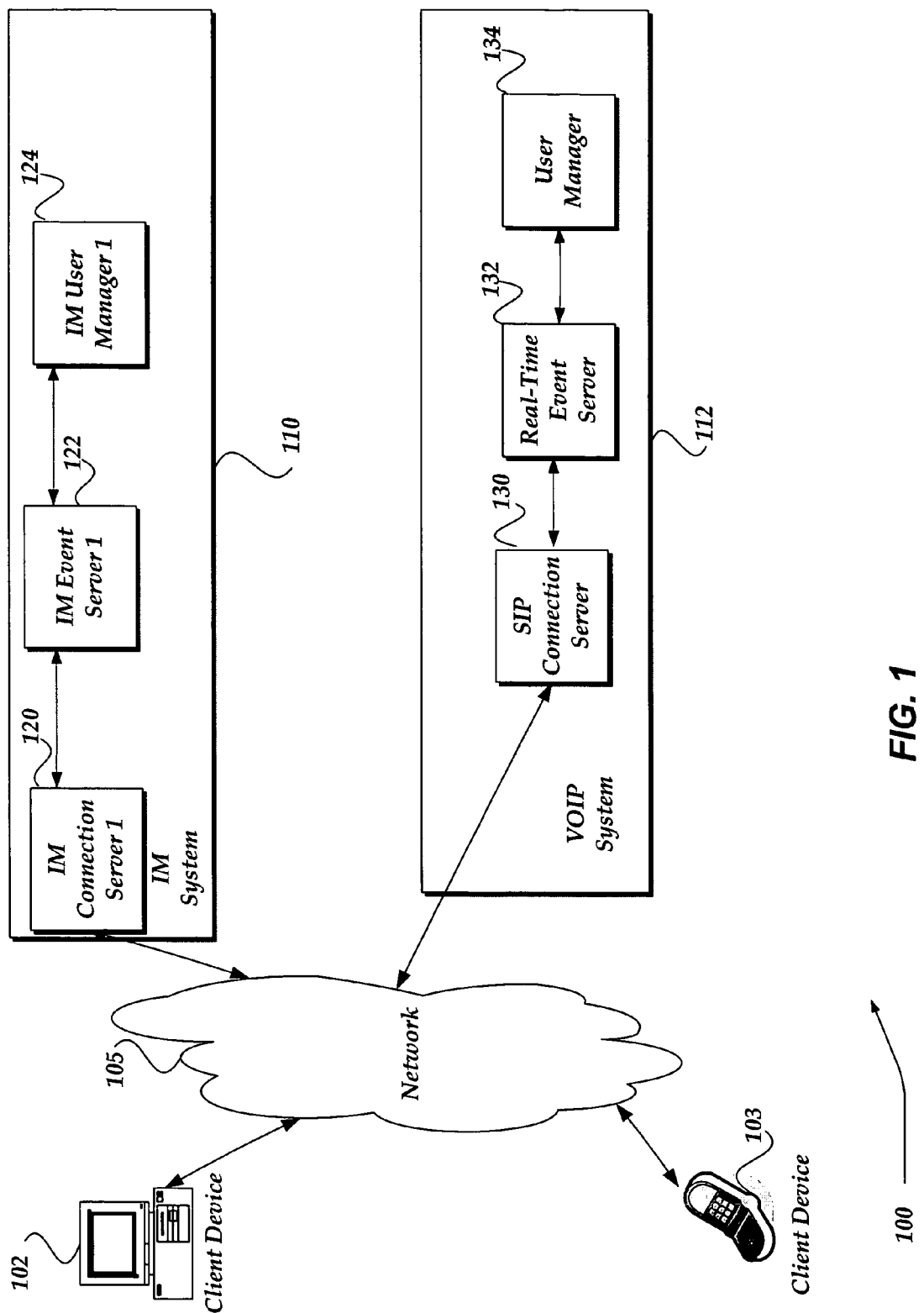
FIG. 1 shows a functional block diagram illustrating one embodiment of an environment for practicing the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

A typical problem during a VOIP conversation is that one or more parties to the conversation may miss a portion of the conversation for any of a variety of reasons, including, becoming distracted, failure of a listening component, complexity of the conversation, or the like. In such instances, missing the portion of the conversation may result in possible negative consequences, such as requesting the other party to repeat themselves, or the like. Thus, the present invention is directed to addressing this issue, as well as others.

Briefly stated, therefore, the present invention is directed towards a system, method, and apparatus that enable a user to record VOIP conversations for selective instant replay. In one embodiment, a VOIP session may be initiated through an Instant Messenger (IM) application. In one embodiment, at least a portion of the VOIP conversation associated with the VOIP session is automatically recorded. In another embodiment, the user may select to record at least a portion of the VOIP conversation. In another embodiment, the other party to the VOIP conversation may be provided an indicator that the conversation is being recorded. At any point during the VOIP conversation, the user may select to bookmark a position within the VOIP conversation for later replay. In addition, during the VOIP conversation, the user may select to instantly replay at least some of the recorded VOIP conversation. The user may select to instantly replay from a beginning of the recorded VOIP conversation, from a bookmarked position, or from a pre-determined time interval back into the recorded VOIP conversation, or the like. Upon completion of the instant replay, the user may then return to the VOIP conversation at a latest chronological rewind position within the recorded VOIP conversation.

In one embodiment, while the user is replaying a portion of the VOIP conversation, the other party to the conversation may be provided with an indication that the user is in instant replay. The indication may include a flashing icon, button, a message, or the like.

Illustrative Operating Environment

FIG. 1 illustrates one embodiment of an environment in which the present invention may operate. However, not all of these components may be required to practice the invention, and variations in the arrangement and type of the components may be made without departing from the spirit or scope of the invention.

As shown in the figure, system 100 includes client devices 102-103, network 105, IM system 110, and VOIP system 112. IM system 110 may include IM connection server 120, IM event server 122, and IM user manager 124. VOIP system 112 may include Session Initiation Protocol (SIP) connection server 130, Real-Time event server 132, and user manager 134.

Client devices 102-103 are in communication with IM connection server 120, SIP connection server 130, and each other, through network 105. IM event server 122 is in communication with IM connection server 120 and IM user manager 124. Real-time event server 132 is in communication with SIP connection server 130 and user manager 134.

One embodiment of client devices 102-103 is described in more detail below in conjunction with FIG. 1. Briefly, however, client devices 102-103 may include virtually any computing device capable of connecting to another computing device and receiving information. Such devices may include portable devices such as, cellular telephones, smart phones, display pagers, radio frequency (RF) devices, infrared (IR) devices, Personal Digital Assistants (PDAs), handheld computers, wearable computers, tablet computers, integrated devices combining one or more of the preceding devices, and the like. Client devices 102-103 may also include other computing devices, such as personal computers, desktop computers, multiprocessor systems, microprocessor-based or programmable consumer electronics, network PCs, and the like. As such, client devices 102-103 may range widely in terms of capabilities and features. For example, a client device configured as a VOIP phone may have a numeric keypad and a few lines of monochrome LCD display. In another example, a web-enabled client device may have a touch sensitive screen, a stylus, and several lines of color LCD display in which both text and graphics may be displayed. Moreover, the web-enabled client device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript, EXtensible HTML (xHTML), Compact HTML (CHTML), and the like, to display and send a message.

Client devices 102-103 also may include at least one client application that is configured to receive content from another computing device. The client application may include a capability to provide and receive textual content, graphical content, audio content, alerts, messages, and the like. Moreover, client devices 102-103 may be further configured to communicate a message, such as through a Short Message Service (SMS), Multimedia Message Service (MMS), instant messaging (IM), internet relay chat (IRC), mIRC, Jabber, and the like, between another computing device, and the like.

Client devices 102-103 may also be enabled to communicate using Voice over Internet Protocol (VOIP). For example, client devices 102-103 may employ Real-time Transport Protocol (RTP) for communicating media data such as audio and video to another device. However, the invention is not so limited, and another communication protocol may be employed, including IAX, and the like. Client devices 102-103 may also employ the Session Initiation Protocol (SIP) protocol for enabling setting up a session and enabling such actions as dialing a number, enabling a ring, a ring-back tone, busy signal, and the like. However, other signaling protocols may also be employed, including H.323, Skinny Client Control Protocol (SCCP), IAX, MiNET, and the like. Typically, however, client devices 102-103 may employ SIP over either User Datagram Protocol (UDP) or Transmission Control Protocol (TCP) and RTP over UDP. In one embodiment, client devices 102-103 may employ a VOIP client application to perform VOIP communications. In one embodiment, the VOIP client application may be integrated within another application, such as an IM client application, or the like.

Moreover, client devices 102-103 may include another client application that is configured to enable a user to record a VOIP conversation such that at least a portion of the VOIP conversation may be selectively replayed instantly. Such instant replay implies, that upon selection of a rewind option for replay, the position within the recorded VOIP conversation is located and replay from that position commences substantially at once, without further intervention from the user.

In one embodiment, the VOIP conversation may be automatically recorded upon initiation of the conversation. In another embodiment, the user may select to record at least a portion of the VOIP conversation. During the VOIP conversation, the user may select to instantly replay at least some of the recorded VOIP conversation from a beginning of the recorded conversation, from a bookmarked position, from a pre-determined time interval into the recorded conversation, or the like. Upon completion of the instant replay, the user may then return to a latest chronological rewind position within the recorded VOIP conversation, rewind to another position, or the like. In one embodiment, the client application provides a user interface useable for managing recording and instant replay of the VOIP conversation. In one embodiment, the client application may employ an interface such as described below in conjunction with FIG. 4. In addition, in one embodiment, the client devices 102-103 may employ a process such as described below in conjunction with FIG. 3 to perform at least some of its actions.

Client devices 102-103 may also be configured to provide an address during a communication. The address may employ any of a variety of mechanisms, including a device model number, a carrier address, a mobile identification number (MIN), or the like. The MIN may be a telephone number, a Mobile Subscriber Integrated Services Digital Network (MSISDN), an electronic serial number (ESN), or other device address. The address may also be an IP address associated with one of the client devices 102-103. In one embodiment, client devices 102-103 may also provide information associated with an account for a network service, or the like.

Network 105 is configured to couple one computing device with another computing device. Network 105 may be enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Network 105 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Network 105 may also include an autonomous system of terminals, gateways, routers, and the like connected by wireless radio links, and the like. These connectors may be configured to move freely and randomly and organize themselves arbitrarily, such that the topology of network 105 may change rapidly.

Network 105 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, and future access networks may enable wide area coverage for mobile devices with various degrees of mobility. For example, network 105 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. In essence, network 105 may include virtually any wired and/or wireless communication mechanisms by which information may travel between one computing device and another computing device, network, and the like.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

IM system 110 is configured to manage IM sessions between client devices employing an IM client. IM system 110 may employ IM connection server 120, IM event server 122, and IM user manager 124 to manage one or more IM sessions. In one embodiment, IM connection server 120, IM event server 122, and IM user manager 124 may represent separate server processes operating with a single computing device. In another embodiment, IM connection server 120, IM event server 122, and IM user manager 124 may represent distinct processes operating across multiple computing devices. As such, IM system 110 may be implemented on a variety of computing devices including personal computers, desktop computers, multiprocessor systems, microprocessor-based devices, network PCs, servers, network appliances, and the like.

IM connection server 120 is configured to receive a request to establish an IM session from an IM client, such as might be included within client devices 102-103, or the like. IM connection server 120 may also receive from the IM client authentication information that may be employed to authenticate an end-user of the IM client. If the end-user is authenticated, IM connection server 120 may enable the IM client to log into the IM session. IM connections servers 120 may also be configured to provide information about the established session to IM event server 122. IM connection server 120 may also forward various request information from the IM client to IM event server 122. Such request information may include, for example, a request to locate and communicate with another IM end-user.

IM event server 122 is configured to receive the end-user's log in and other request information from IM connections servers 120. IM event server 122 may request IM user manager 124 to store information about the IM client and end-user. IM user manger 124 may employ a table, spreadsheet, file, database, and the like, to register the IM client, and on which IM connection server, within IM connection server 120, the IM client is logged into. Thus, IM user manager 124 may store information about various IM conversations that may include such information as identifiers for end-users associated with an IM conversation, time information, account identifiers for the end-users, IM connection servers associated with an IM conversation, and so forth. As such, IM event server 122 may also employ IM user manager 124 to determine which IM connection server, within IM connection server 122, another end-user is logged into, and provide such information to IM connection server 120, so that an IM session may be established between two or more IM end-users.

VOIP system 112 is configured to manage VOIP sessions between client devices using any of a variety of VOIP protocols. VOIP system 112 is further configured to enable a variety of client devices and client applications to access voice mail messages.

As shown, VOIP system 112 may be implemented in a single computing device, with each of the illustrated components operating as one or more processes with the single computing device. VOIP system 112 may also be implemented across multiple computing devices, with one or more of the illustrated components distributed across the multiple computing devices. As such VOIP system 112 may be implemented on a variety of computing devices including personal computers, desktop computers, multiprocessor systems, microprocessor-based devices, network PCs, servers, network appliances, and the like.

SIP connection server 130 is configured to receive a request to establish a SIP connection from client devices 102-103, or the like. The requesting device may provide identification information to SIP connection server 130 that may be used, at least in part, to authenticate the request to establish the SIP connection. If the requesting device is authenticated, SIP connection server 130 may enable the requesting device to log into a connection. SIP connection server 130 may also provide information about the requesting device to real-time event server 132. Real-time event server 132 may be configured to receive the information and provide it to user manager 134 for storage.

User manager 134 may store the information in a database, spreadsheet, table, file, and the like. Such information may include, for example, an identifier associated with the requesting device, an end-user associated with the requesting device, an address associated with SIP connection server 130, and the like. User manager 134 may receive and manage such information for a plurality of requesting devices. User manager 134 may also provide information to real-time event server 132 about at least one other requesting device, such that SIP connection server 130 may enable a VOIP communication between one or more end-user devices, such as client devices 102-103, and the like.

Illustrative Client Device

Figure 2:
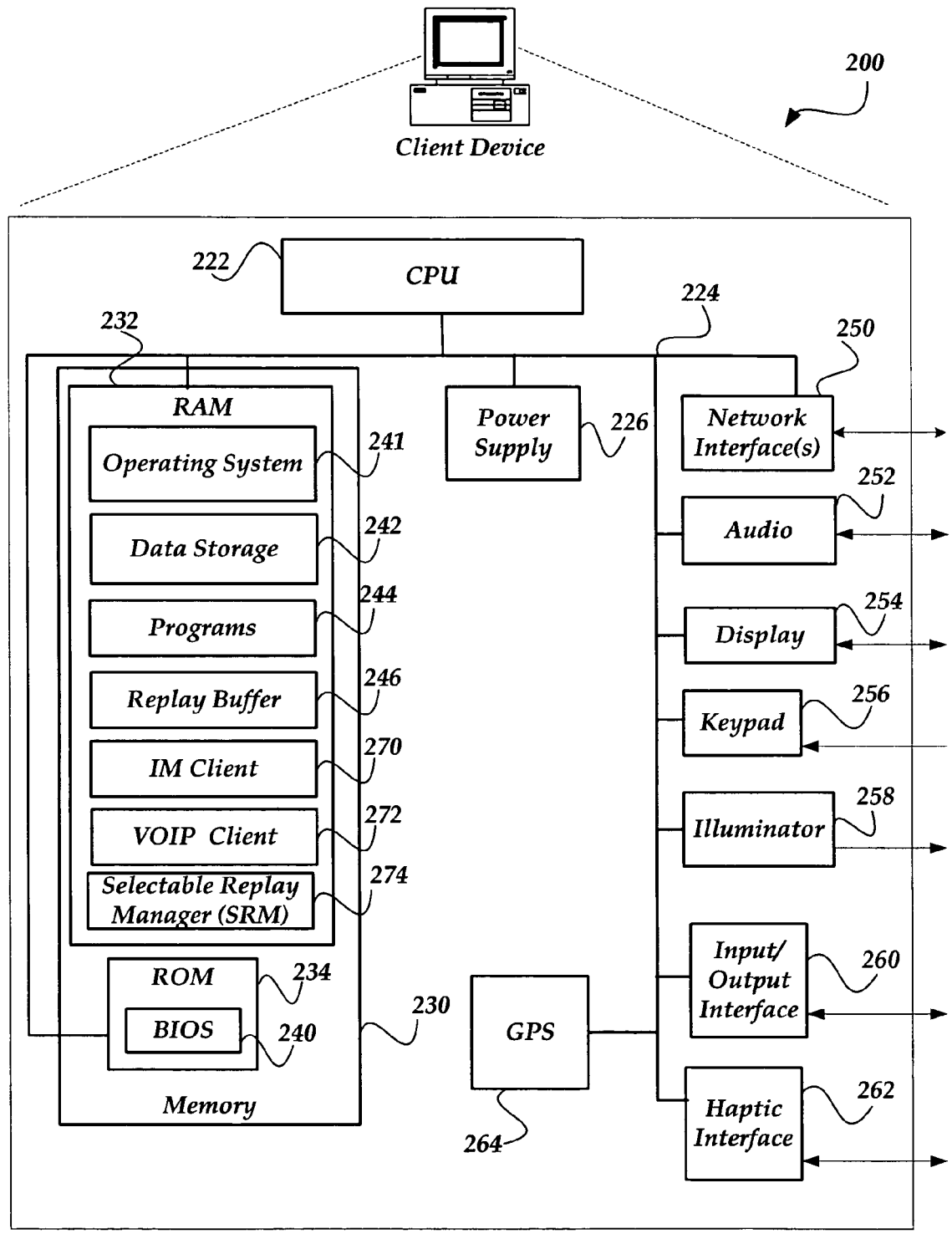
FIG. 2 shows one embodiment of a client device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. As shown in the figure, client device 200 includes central processing unit (CPU) 222 in communication with mass memory 230 via a bus 224.

Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), UDP, TCP/Internet protocol (TCP/IP), SMS, general packet radio service (GPRS), WAP, ultra wide band (UWB), IEEE 802.16 Worldwide Interoperability for Microwave Access (WiMax), SIP/RTP, and the like. Network interface unit 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, and the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS and the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 242, which can be utilized by client device 200 to store, among other things, programs 244 and/or other data. For example, data storage 242 may also be employed to store information that describes various capabilities of client device 200. The information may then be provided to another device based on any of a variety of events, including being sent as part of a header during a communication, sent upon request, and the like.

Programs 244 may include computer executable instructions which, when executed by client device 200, transmit, receive, and/or otherwise process messages (e.g., SMS, MMS, IM, email, and/or other messages), audio, video, and enable telecommunication with another user of another client device. Other examples of application programs include calendars, contact managers, task managers, transcoders, database programs, word processing programs, spreadsheet programs, games, codec programs, and so forth. In addition, mass memory 230 stores replay buffer 246, IM client 270, VOIP client 272, and Selectable Replay Manager (SRM) 274. Although illustrated as distinct application programs, IM client 270, VOIP client 272, and/or SRM 274 may also be integrated with each other, sub-components of at least one other application, or any combination of distinct and/or integrated components. Thus, in one embodiment, SRM 274 may be integrated within IM client 270, and/or VOIP client 272, without departing from the scope or spirit of the invention.

Replay buffer 246 may include an audio data store that is configured to maintain and store VOIP conversation data. Replay buffer 246 may employ any of a variety of protocols and/or mechanisms for recording and storing the VOIP conversation data, including, but not limited to Moving Pictures Experts Group Audio (MPEG) such as MP2, MP3, MPEG-4 Advanced Audio Coding (AAC), or the like; Dolby Digital, EPAC; Window's Media Audio (WMA); QuickTime; Audio Interchange File Format (AIFF); AUdio file (AU); or the like. Replay buffer 246 may also include one or more locators, such as bookmarks configured to enable a user to locate a portion within the VOIP conversation data.

In one embodiment, replay buffer 246 may be configured to record and store a pre-determined duration of VOIP conversation data. For example, replay buffer 246 may be arranged to store 10-60 seconds of VOIP conversation data. However, the invention is not so limited, and replay buffer 236 may also be configured to store more or less than this amount of VOIP conversation data.

In one embodiment, replay buffer 246 is configured to maintain a constant historical buffer during a rewind mode for instant replay of at least a portion of the recorded VOIP conversation. In another embodiment, replay buffer 246 may be configured to operate as a sliding buffer window, recording the pre-determined duration of data, and deleting data that may be further back than the pre-determined duration. However, the invention is not so limited. For example, in one embodiment replay buffer 246 may be configured to record an entire VOIP conversation, from initiation through VOIP session termination. In one embodiment, replay buffer 246 may continue to record the VOIP conversation even during a rewind and replay of another portion of the VOIP conversation.

In still another embodiment, replay buffer 246 may be directed to optimizing use of resources by employing an algorithm that might not record when a volume is below a minimum value, or some other measure of silence, including such as pitch, volume, or the like. In one embodiment, replay buffer 246 may also employ any of a variety of audio compression techniques to further optimize the use of resources.

IM client 270 may be configured to initiate and manage an instant messaging session. IM client 270 may include, but not be limited to AOL Instant Messenger, Yahoo! Messenger, .NET Messenger Server, ICQ, or the like. In one embodiment, IM client 270 may be configured to employ a VOIP client, such as VOIP client 272 to integrate IM/VOIP features. Thus, in one embodiment, IM client 270 may employ SIP to establish media sessions with another computing device employing an IM/VOIP capable client, and RTP to communicate the media traffic. However IM client 270 is not so limited. For example, IM client 270 may also employ any of the following SIMPLE (SIP for Instant Messaging and Presence Leverage), APEX (Application Exchange), Prim (Presence and Instant Messaging Protocol), the open XML-based XMPP (Extensible Messaging and Presence Protocol), more commonly known as Jabber and OMA (Open Mobile Alliance)'s IMPS (Instant Messaging and Presence Service) created specifically for mobile devices, and the like.

VOIP client 272 is configured to enable client device 200 to initiate and manage a VOIP session with another client device. VOIP client 272 may employ the SIP protocol for managing signaling, and RTP for transmitting the VOIP traffic ("media"). However, the invention is not so constrained, and any of a variety of other VOIP protocols may be employed including IAX which carries both signaling and voice data, H.323, SCCP, Megaco, MGCP, MiNET, Skinny Client Control Protocol (SCCP), and the like. VOIP client 272 may be further configured to employ virtually any media codec to compress the media stream for communicating it over the network, including G.711, G.729, G.729a, iSAC, Speex, and the like. In one embodiment, SIP may be employed to enable a Session Description Protocol (SDP).

VOIP client 272 may be further configured to manage a flow of VOIP packets to and/or from another computing device. In one embodiment, VOIP client 272 may employ these components to provide the packets using RTP with RTCP. VOIP client 272 may employ an RTCP report from a destination device to determine various qualities of communications, including flow control, congestion control, quality of service, and the like. VOIP client 272 may, for example, determine, based at least in part, on the RTCP report that it may want to modify its transmission of the RTP packets. Thus, in one embodiment, VOIP client 272 may elect to employ a lower speed codec, or the like. Such actions by VOIP client 272 are directed towards reducing a number of packets transmitted, and/or otherwise slowing down the flow of packets. This may provide the destination device a sufficient opportunity to catch-up. The invention is not limited to modifying the codecs, however, and virtually any other mechanism may be employed to modify the transmission of packets, without departing from the scope or spirit of the invention.

Although not shown, client device 200 may also be configured to receive a message from another computing device, employing another mechanism, including, but not limited to email, Short Message Service (SMS), Multimedia Message Service (MMS), internet relay chat (IRC), mIRC, and the like.

SRM 274 is configured to enable the user to record VOIP conversations for selectable instant replay. SRM 274 may provide an interface, such as described below in conjunction with FIG. 4 for use in managing the recording and selectable replay of the recorded VOIP conversation.

SRM 274 may initiate recordation of a VOIP conversation when a VOIP session begins. However, the invention is not so limited, and SRM 274 may also enable the user to selectively record at least a portion of the VOIP conversation, or to otherwise terminate recordation of the VOIP conversation. SRM 274 may employ replay buffer 246 for storing and managing the recorded VOIP conversation data.

SRM 274 further enables the user to associate a bookmark, or other position locator, with a position within the recorded VOIP conversation such that the user may locate the 'marked' position. In one embodiment, SRM 274 enables the user to associate a plurality of position locators, each to a different position within the recorded VOIP conversation.

In one embodiment, SRM 274 may provide a message, flag, signal, or the like, that indicates to another party to the VOIP conversation that the conversation is being recorded. In one embodiment, SRM 274 may also enable the user to rewind for instant replay, at least a portion of the recorded VOIP conversation. SRM 274 may provide a variety of mechanisms for selecting where to rewind to within the recorded VOIP conversation, including, but not limited to, a button, a slider-bar, a menu, or the like. In one embodiment, SRM 274 may enable the user to rewind to a beginning of the recorded conversation, to a bookmarked position, to a pre-determined interval into the recorded conversation, or the like.

Figure 5:
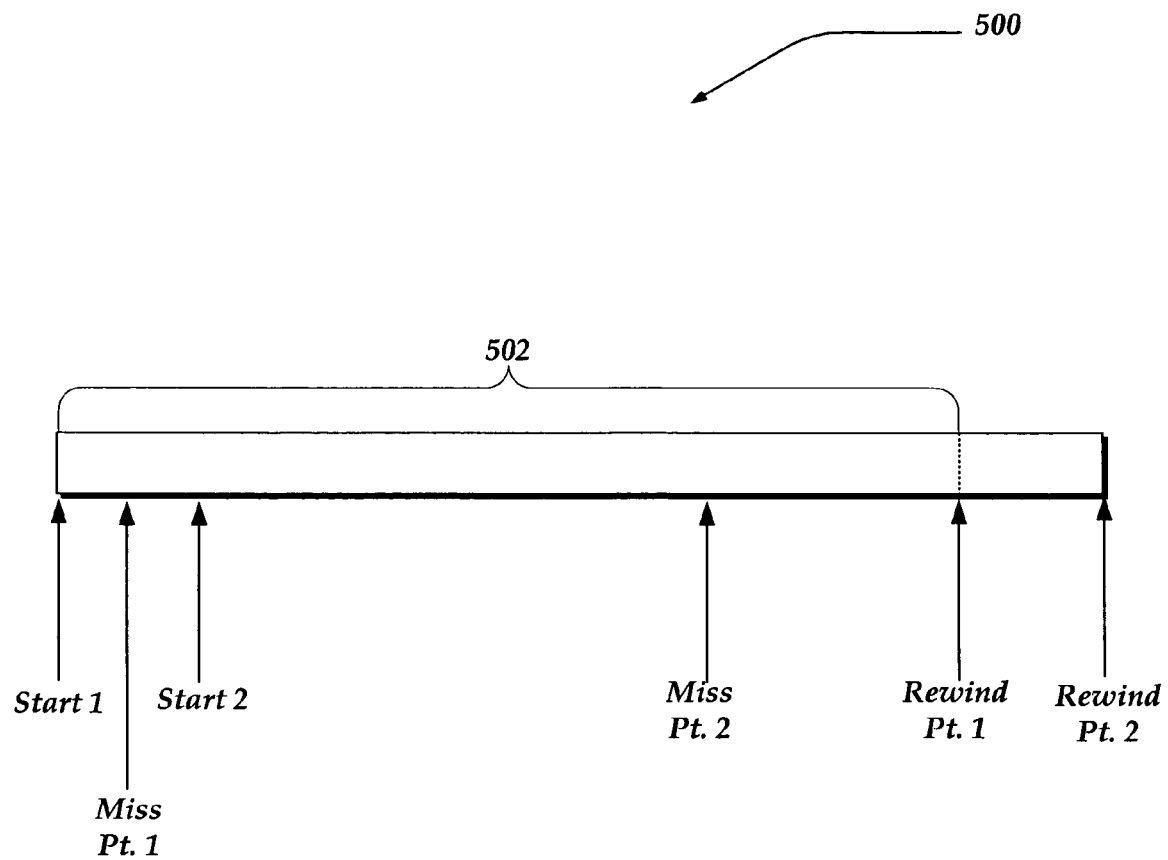
FIG. 5 illustrates a functional block diagram illustrating one embodiment of an instant replay buffer, in accordance with the present invention.

In one embodiment, SRM 274 may manage replay buffer 246 such that at least a pre-determined duration of the VOIP conversation is retained. For example, employing FIG. 5 as an example embodiment of replay buffer 246 with identified start, missed, and rewind example points. As shown in FIG. 5, replay buffer 246 is represented by buffer 500, while recorded conversation 502 may be of any predetermined duration. For example, in one embodiment, recorded conversation 502 may be of about 20-60 seconds in duration.

Using FIG. 5, a user may select to rewind buffer 500 from Rewind Pt. 1 to Miss Pt 1 by selecting a 'rewind to beginning' option on an interface, such as described in more detail below in conjunction with FIG. 4. Alternatively, the user may select to employ other options to rewind, including, but not limited to 'rewind by interval,' 'rewind to bookmark,' or the like. When the user elects to return, the user may then-select 'return to conversation,' option, or the like, which may be configured in one embodiment, to return buffer 500 ready for recording at Rewind Pt. 1. In addition, if the user merely wanted to rewind to Miss Pt. 2, the user may employ the 'rewind by interval,' or the 'rewind to bookmark.'

In one embodiment, where the user were to rewind to Rewind Pt. 1 and then listen past that point, and then select to rewind again at Rewind Pt. 2, the 'return to conversation' option might then take the user back to Rewind Pt. 2. However, if instead the user were to rewind from Rewind Pt 2, then select, after listening from Miss Pt. 2, to rewind a second time from Rewind Pt. 1, the 'return to conversation' option might, in one embodiment, take the user back to Rewind Pt. 2. Thus, in one embodiment, SRM 274 might set a marker, or the like, at the latest chronological rewind point for resuming the VOIP conversation rather than the most recent one in buffer 500. However, the invention is not so limited, and other rewind schemes may be employed, without departing from the scope of spirit of the present invention. In one embodiment, SRM 274 may employ a process substantially similar to process 300 described in more detail below, in conjunction with FIG. 3.

Generalized Operation

Figure 3:
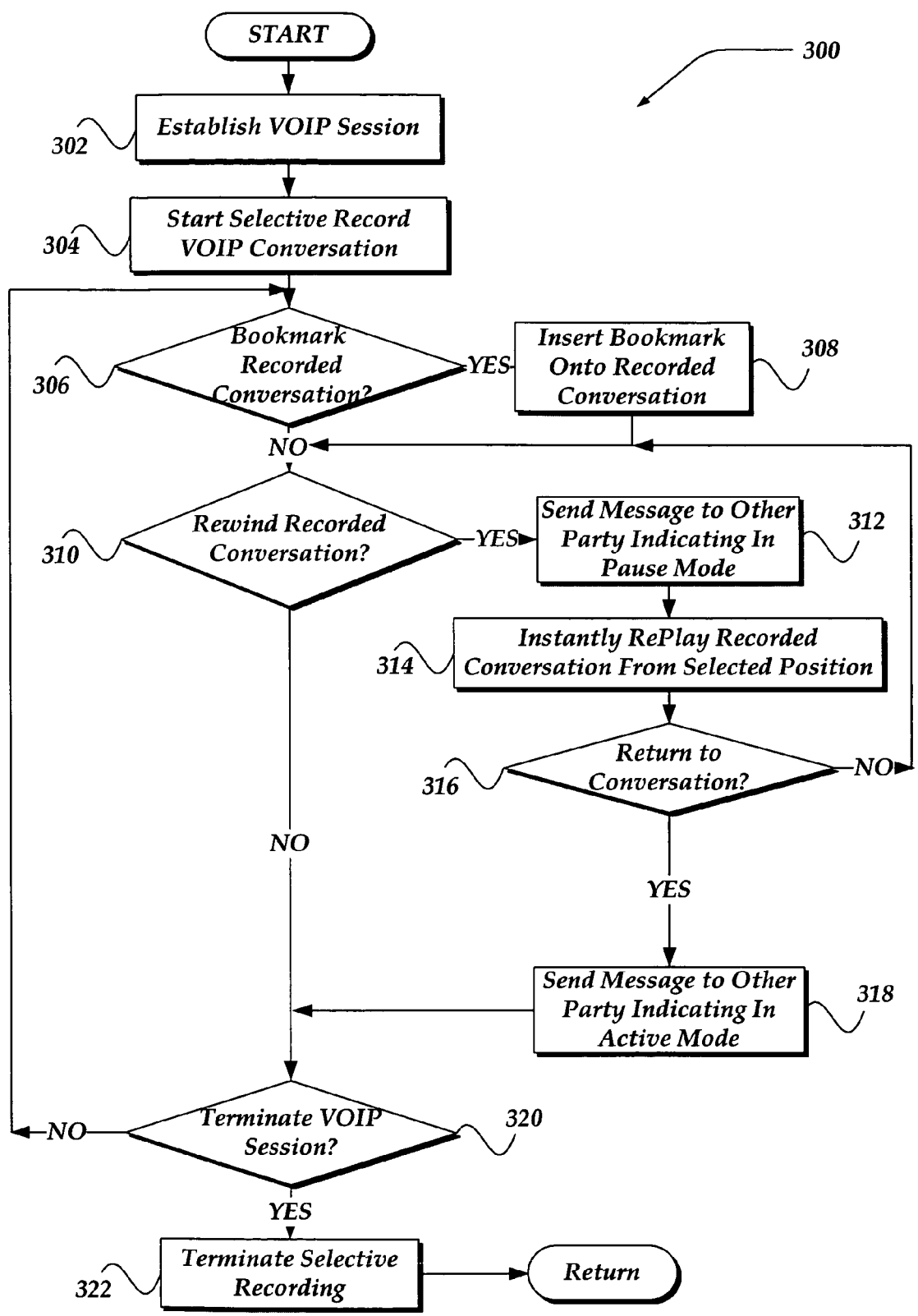
FIG. 3 illustrates a logical flow diagram generally showing one embodiment of a process useable to enable instant replay of buffered VOIP calls.

The operation of certain aspects of the invention will now be described with respect to FIG. 3. FIG. 3 illustrates a logical flow diagram generally showing one embodiment of a process useable to enable instant replay of buffered VOIP calls.

Process 300 begins, after a start block, at block 302, where a VOIP session may be established that enables a VOIP conversation to occur between at least two parties. The VOIP session may be established using any of a variety of VOIP capable applications, including an IM client application that includes VOIP capabilities, a VOIP specific application, or the like. Processing then moves to block 304, where selective recording may commence of the VOIP conversation associated with the VOIP session. In one embodiment, recording of the conversation may begin automatically, upon establishment of the VOIP session between parties. In another embodiment, recording of the conversation may begin when the user selects recording through an instant replay interface. In one embodiment, the other party to the conversation may received a message, signal, or the like, indicating that the conversation is being recorded. This enables the other party to request that the recording be terminated, or allow such recording to continue. If the recording is terminated, process 300 returns to a calling process to perform other actions.

If the parties agree to such recording, process 300 may continue to decision block 306, where a determination is made as to whether the user has selected to bookmark a position within the recorded VOIP conversation. Bookmarking may employ virtually any mechanism that allows the user to identify a position within the recorded conversation such that it may be readily returned to upon selection. If no bookmarking is to be performed, processing flows to decision block 310; otherwise, processing flows to block 308, where a bookmark tag, locator, or other location identifier, is associated with a position within the recorded VOIP conversation. Processing then flows to decision block 310.

At decision block 310, a determination is made whether to rewind the recorded VOIP conversation for instant replay. Rewinding may be based on the user selecting one of the rewind options available through the instant replay interface, including, rewind to beginning, rewind by interval, rewind to bookmark, or the like. In one embodiment, selection of a rewind option may result in rewinding the buffer to the selected position and automatically playing the buffered VOIP audio from that position. If rewinding is selected, processing flows to block 312; otherwise, processing continues to decision block 320.

At block 312, a message, signal, or the like, may be sent to the other party indicating that the user is rewinding and replaying at least a portion of the recorded conversation. Moreover, in one embodiment, the invention may allow continued recording of at least a part of the VOIP conversation. This option may allow, for example, the other party to continue to speak, knowing that the conversation is being recorded for later replay. Thus, when the other party sees that the user is replaying the conversation, the other party may elect to continue speaking, leave a message that the other party has stepped out, stop talking, or the like. In any event, processing continues to block 314, where the recorded conversation is instantly replayed from the selected position, as described above. Processing continues next, to decision block 316, where a determination is made whether the user has selected to return to the conversation, or to continue listening to the recorded conversation. Although not illustrated, during listening to the recorded conversation, the user may at any time, select a pause option that pauses the instant replay of the VOIP recorded conversation. The user may then reselect pause to continue replay, or select another rewind option, or even select to return to the conversation. In any event, if the user selects to return to the conversation, process 300 flows to block 318; otherwise, processing loops back to decision block 310, where the user may select another rewind option. For example, the user may select to rewind to replay another portion of the conversation.

At block 318, the user is returned to a pre-determined location within the instant replay buffer for continued recording. In one embodiment, the pre-determined location may be at the end of the recording of VOIP conversation. That is, at the latest chronological rewind point for resuming the conversation. However, the invention is not so limited, and other positions may also be employed. Moreover, a message, signal, or the like, may be sent to the other party indicating that the user is now available for active participation within the VOIP conversation. Processing then flows to decision block 320 where a determination is made whether the VOIP session is to be terminated. This determination may be based on a user selection, the other party's selection, or the like. In any event, if the VOIP session is to be terminated, processing flows to block 322; otherwise, processing loops back to decision block 306.

At block 322, selective recording of the VOIP conversation may automatically terminate at about the same time as the VOIP session terminates. Processing then returns to the calling process to perform other actions.

Although the discussions above make reference to a single other party to the VOIP conversation, the invention is not so limited. Thus, for example, in one embodiment, the VOIP conversation may include a plurality of parties, such as might arise during a conference call using VOIP. In such a configuration, the invention may provide for recording of multiple parties, sending of status messages to the multiple parties, or the like, without departing from the scope or spirit of the invention.

Moreover, although the above process describes employing the instant replay during an active VOIP session, the invention is not so limited. For example, in one embodiment, the replay buffer may be replayed after the current VOIP session is terminated. In this manner, the recording party, need not appear inattentive, and instead may re-listen to the conversation at a later time. In another embodiment, the invention may also be configured such that upon termination of an active VOIP session, the replay buffer is erased. This embodiment may be desirable where resources are limited, security is desired, or the like.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions. Moreover, at least some of the blocks of the flowchart illustration, and combinations of some of the blocks in the flowchart illustration, can also be implemented using a manual mechanism, without departing from the scope or spirit of the invention.

Figure 4:
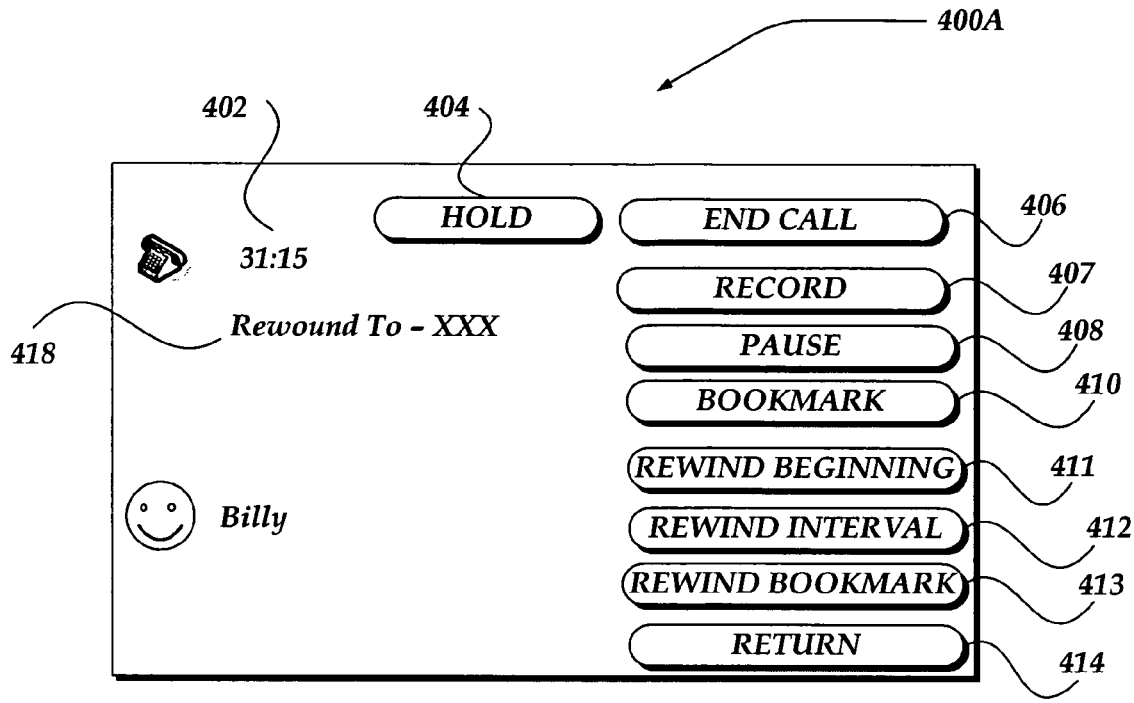
FIG. 4 illustrates embodiments of example screen displays useable in enabling instant replay.
Figure 4:
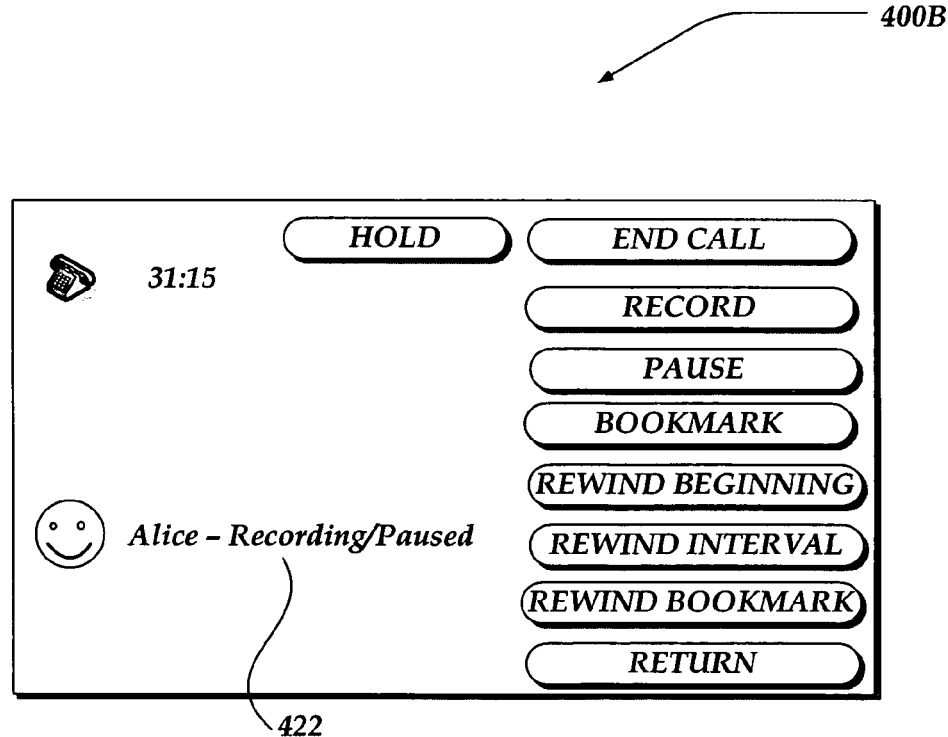

FIG. 4 illustrates embodiments of example screen displays useable in enabling instant replay. FIG. 4 may include many more or less components than those. However, the components shown are sufficient to disclose an illustrative embodiment for practicing the present invention.

Shown in FIG. 4, are example embodiments of user interface 400A and another party interface 400B. As shown, user interface 400A and other party interface 400B are substantially similar.

User interface 400A includes, for example, duration of call 402 that indicates a duration of a current VOIP conversation. User interface 400A further includes hold button 404, end call button 406, record button 406, pause button 408, bookmark button 410, rewind [to] beginning button 411, rewind [by] interval button 412, rewind [to] bookmark button 413, and return [to conversation] button 414. Other party interface 400B includes substantially similar buttons. Each of the buttons is configured to operate substantially as described above. For example, hold button 404 may place a current VOIP session into a hold mode, which may be signaled to the other party, by various ways, including, illuminating the other party's hold button, or the like. Similarly, end call button 406 may be employed to terminate the current VOIP session. Record button 407 enables a party to initiate recording of the VOIP conversation associated with the VOIP session. Bookmark 410 enables a party to tag a position within the recorded conversation for possible later return. Rewind buttons, 411-413 enable a party to select how to rewind the recorded conversation for instant replay; pause button 408 allows the party listening to the replayed conversation to pause the replay and/or un-pause the replay; while return button 414 enables the party to return to the VOIP conversation.

In one embodiment, user interface 400A may also illustrate rewind position indicator 418 that is configured to show a position within the recorded conversation to which the user has selected to return. In another embodiment, other party's interface 400B may also illustrate the user's status 422. Thus, for example, status 422 shows that the user is recording the current VOIP conversation, but has also paused, perhaps to instantly replay a portion of the conversation or the like. The invention is not so limited, however, to this status message, and a variety of others, may also be provided, including, but not limited, to hold mode, rewinding, or the like. Such indications are directed towards allowing the other party to select whether to continue a conversation, request that recording be discontinued, or some other action.

Moreover, although multiple buttons have been illustrated, the invention is not so limited, for example, pull-down menus may be employed, or the like. Moreover, a button may serve multiple functions, including, for example, enabling the hold button to perform a pause function, or be illuminated to indicate that the other party is in hold or pause, or the like. In one embodiment, the other party's record button might illuminate one color to indicate that the user is recording the conversation, or illuminate such a message, while illuminating a different color, a different message, or the like, when the other party is recording. Thus, the invention is not constrained by the interfaces illustrated within FIG. 4, as they are intended merely as examples, of possible embodiments of interfaces.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method of managing a VOIP session over a network, comprising:
    establishing the VOIP session over the network, wherein the VOIP session enables a VOIP conversation between a first party and a second party;
    enabling at least one of the first or the second party to record at least a portion of the VOIP conversation; and
    while the VOIP conversation is being recorded, receiving a request to rewind to a position within the recorded VOIP conversation from the first party, automatically rewinding to and instantly replaying the VOIP conversation from the requested position, while still recording the VOIP conversation of at least the second party, and further automatically sending a message to the second party indicating that the first party is replaying at least a portion of the VOIP conversation.

2. The method of claim 1, wherein enabling at least one of the first or the second party to record further comprises providing a user interface accessible through an Instant Messaging (IM) application.

3. The method of claim 1, wherein while the VOIP conversation is being recorded providing an interface to the first party that enables the first party to bookmark a position within the VOIP conversation that is useable to identify a location to rewind the VOIP conversation.

4. The method of claim 1, further comprising:
    providing a message to the other of the second or the first party indicating that the VOIP conversation is being recorded.

5. The method of claim 1, wherein enabling at least a portion of the VOIP conversation to be recorded further comprises, recording a pre-determined duration of the VOIP conversation using a sliding window, or recording the entire VOIP conversation.

6. The method of claim 1, further comprising:
    receiving a request from the first party to return to the VOIP conversation; and
    returning the first party to an end location within the VOIP conversation.

7. A computer-readable storage medium that is configured to store program instructions for performing the method of claim 1.

8. A system for managing a VOIP session over a network, comprising:
    a replay buffer that is operative to store VOIP conversation data;
    a VOIP component that is operative to establish the VOIP session for enabling a VOIP conversation over the network; and
    a selectable replay component that is operative to perform actions, including:
        recording to the replay buffer at least a portion of the VOIP conversation; and while the VOIP conversation is still being recorded, receiving a request to rewind to a position within the recorded VOIP conversation, automatically rewinding to and instantly replaying the VOIP conversation from the requested position while still recording the VOIP conversation of at least a party to the VOIP conversation not requesting the rewind, and further automatically sending a message to the non requesting party indicating that another party is replaying at least a portion of the VOIP conversation.

9. The system of claim 8, wherein the selectable replay component is integrated within the VOIP component.

10. The system of claim 8, wherein the selectable replay component is operative to perform actions, further including:
providing a message over the network indicating that the VOIP conversation is being recorded.

11. The system of claim 8, further comprising:
a user interface that is operative to receive a user selection for managing recording and replay of the VOIP conversation, including at least one of a button, icon, or menu arranged to enable selection of at least one of recording the VOIP conversation, pausing a replay, bookmarking a position within the recorded VOIP conversation, or rewinding the recorded VOIP conversation.

12. The system of claim 8, wherein recording to the replay buffer is automatically initiated upon establishing of the VOIP session.

13. The system of claim 8, wherein the system resides within a mobile device.

14. The system of claim 8, wherein the request to rewind further comprises at least one of a request to rewind to a bookmark, rewind to a beginning, or rewind by an pre-determined interval.

15. A client device that is operative to manage a VOIP conversation over a network, comprising:
a buffer component for storing VOIP conversation data;
a processing component for executing data that enables actions, including:
automatically recording the VOIP conversation when a VOIP session is established with another client device;
automatically sending a message to the other client device indicating that the VOIP conversation is being recorded; and
while the VOIP conversation is being recorded, receiving a request to rewind to a position within the recorded VOIP conversation, automatically replaying the VOIP conversation from the requested position to a requesting party of the VOIP conversation while still recording at least the VOIP conversation of the non-requesting party, and further automatically sending a message to the non-requesting party indicating that the requesting party is replaying at least a portion of the VOIP conversation.

16. The client device of claim 15, the actions further comprising:
if a request to return to the VOIP conversation is received, automatically sending a message to the other client device, indicating that the requesting party has returned to VOIP conversation.

17. The client device of claim 15, wherein if a request to rewind to a position within the recorded VOIP conversation is received, further comprises automatically sending a message to the other client device indicating that the client device is in a pause mode.

18. The client device of claim 15, wherein the buffer component is arranged to operate to at least one of record an entire VOIP conversation, or to record a portion of the VOIP conversation based in part on a sliding buffer window.

19. A computer-readable storage medium that has stored thereon data and computer executable instructions, wherein the execution of the instructions by a computer device provides for the management of a VOIP conversation over a network by enabling actions, including:
recording the VOIP conversation when a VOIP session is established;
automatically sending a message indicating that the VOIP conversation is being recorded;
while the VOIP conversation is being recorded, receiving a request from a first party to rewind to a position within the recorded VOIP conversation, automatically replaying the VOIP conversation from the requested position while still recording the VOIP conversation, and further automatically sending a message to a second party indicating that the first party is replaying at least a portion of the VOIP conversation; and
while the VOIP conversation is being recorded, receiving a request to return to the VOIP, returning the VOIP conversation at a latest chronological rewind position while still recording the VOIP conversation.

20. The computer-readable storage medium of claim 19, wherein the requested position is identified by a bookmark that is entered by the first party while the VOIP conversation is being recorded.

\* \* \* \* \*